US012437627B2

(12) United States Patent
Drees et al.

(10) Patent No.: US 12,437,627 B2
(45) Date of Patent: Oct. 7, 2025

(54) SYSTEMS AND METHODS FOR ON-SITE PATHOGEN DETECTION

(71) Applicant: Tyco Fire & Security GmbH, Neuhausen am Rheinfall (CH)

(72) Inventors: Kirk H. Drees, Cedarburg, WI (US); Jonathan D. Douglas, Mequon, WI (US); Bernard P. Clement, Mequon, WI (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 0 days.

(21) Appl. No.: 18/271,549

(22) PCT Filed: Jan. 14, 2022

(86) PCT No.: PCT/US2022/012467
§ 371 (c)(1),
(2) Date: Jul. 10, 2023

(87) PCT Pub. No.: WO2022/155439
PCT Pub. Date: Jul. 21, 2022

(65) Prior Publication Data

US 2024/0312330 A1 Sep. 19, 2024

Related U.S. Application Data

(60) Provisional application No. 63/138,079, filed on Jan. 15, 2021.

(51) Int. Cl.
*G08B 21/12* (2006.01)
*G08B 25/14* (2006.01)

(52) U.S. Cl.
CPC ............ *G08B 21/12* (2013.01); *G08B 25/14* (2013.01)

(58) Field of Classification Search
CPC ................................ G08B 21/12; G08B 25/14
See application file for complete search history.

(56) References Cited

U.S. PATENT DOCUMENTS 7,096,125 B2 8/2006 Padmanabhan et al.
10,741,278 B2 * 8/2020 Sperry .................... C12Q 1/04
(Continued)

FOREIGN PATENT DOCUMENTS

WO WO-2021/011497 A1 1/2021
WO WO-2021/258116 A1 12/2021
WO WO-2022/125687 A1 6/2022

OTHER PUBLICATIONS

Alvarado et al., "A Methodology to Monitor Airborne PM10 Dust Particles Using a Small Unmanned Aerial Vehicle," Sensors, 2017, vol. 17 (25 pages).
(Continued)

*Primary Examiner* — John A Tweel, Jr.
(74) *Attorney, Agent, or Firm* — Foley & Lardner LLP

(57) ABSTRACT

A pathogen detection system for a building includes multiple pathogen detectors positioned in the building at different locations. The pathogen detectors are configured to output detection data including a detected presence of a pathogen. The pathogen detection system includes processing circuitry configured to obtain the detection data from the pathogen detectors. The processing circuitry is also configured to determine a responsive action based on the detected presence of the pathogen, and the locations. The responsive action includes a magnitude of effect and a magnitude of locality. The processing circuitry is configured to perform the responsive action or initiate the responsive action.

20 Claims, 7 Drawing Sheets

(56) References Cited

U.S. PATENT DOCUMENTS

| | | | | |
|---|---|---|---|---|
| 2012/0179491 | A1* | 7/2012 | Liu | G16H 15/00 705/2 |
| 2013/0309154 | A1 | 11/2013 | Call et al. | |
| 2021/0011443 | A1 | 1/2021 | Mcnamara et al. | |
| 2021/0011444 | A1 | 1/2021 | Risbeck et al. | |
| 2021/0193309 | A1 | 6/2021 | Boisvert et al. | |
| 2021/0390807 | A1 | 12/2021 | Chaurasia et al. | |
| 2021/0390812 | A1 | 12/2021 | Chaurasia et al. | |
| 2021/0391089 | A1 | 12/2021 | Eswara et al. | |
| 2021/0398659 | A1 | 12/2021 | Sharma et al. | |
| 2021/0398690 | A1 | 12/2021 | Gibson et al. | |
| 2021/0398691 | A1 | 12/2021 | Dhamija et al. | |
| 2022/0060856 | A1 | 2/2022 | Wellig et al. | |
| 2022/0203287 | A1 | 6/2022 | Wenger et al. | |
| 2022/0203288 | A1 | 6/2022 | Wenger et al. | |
| 2022/0205962 | A1 | 6/2022 | Vanderkoy | |
| 2022/0207215 | A1 | 6/2022 | Liu et al. | |
| 2022/0221184 | A1 | 7/2022 | Gupta et al. | |
| 2022/0228756 | A1 | 7/2022 | Gupta et al. | |
| 2022/0254483 | A1 | 8/2022 | Boisvert et al. | |
| 2022/0277851 | A1 | 9/2022 | Wellig | |
| 2022/0282886 | A1 | 9/2022 | Hriljac et al. | |
| 2022/0293261 | A1 | 9/2022 | Mcbrady et al. | |
| 2022/0305438 | A1 | 9/2022 | Wenger et al. | |
| 2022/0305881 | A1 | 9/2022 | Neu et al. | |

OTHER PUBLICATIONS

International Search Report and Written Opinion on PCT Appl. No. PCT/US2022/012467 dated Apr. 25, 2022 (14 pages).

* cited by examiner

SYSTEMS AND METHODS FOR ON-SITE PATHOGEN DETECTION

CROSS-REFERENCE TO RELATED PATENT APPLICATION

This application claims the benefit of U.S. Provisional Patent Application No. 63/138,079, filed Jan. 15, 2021, the entire disclosure of which is incorporated by reference herein.

BACKGROUND

The present disclosure relates generally to building management systems. More particularly, the present disclosure relates to building management systems for mitigating infection risk.

SUMMARY

One implementation of the present disclosure is pathogen detection system for a building, according to some embodiments. In some embodiments, the pathogen detection system includes multiple pathogen detectors positioned in the building at different locations. The pathogen detectors are configured to output detection data including a detected presence of a pathogen, according to some embodiments. The pathogen detection system includes processing circuitry configured to obtain the detection data from the pathogen detectors, according to some embodiments. In some embodiments, the processing circuitry is also configured to determine a responsive action based on the detected presence of the pathogen, and the locations. In some embodiments, the processing circuitry is configured to perform the responsive action or initiate the responsive action.

In some embodiments, the pathogen detectors are positioned at least one of proximate an entrance of the building, in a high-traffic area of the building, within a return air vent of the building, in a room of the building, or in a sewage line of the building.

In some embodiments, the responsive action includes a magnitude of effect. In some embodiments, the magnitude of effect of the responsive action is an expected infection risk reduction that results from performing the responsive action. In some embodiments, the processing circuitry is configured to determine the responsive action that has a desired value of the expected infection risk based on a type of pathogen detected and a number of instances of detection of the pathogen in the building.

In some embodiments, the responsive action includes a magnitude of locality. In some embodiments, the magnitude of locality defines a number of areas of the building affected by the responsive action. In some embodiments, the processing circuitry is configured to determine the magnitude of locality for the responsive action based on a location of the detectors that detect the pathogen.

In some embodiments, the processing circuitry is further configured to determine a magnitude of pathogen detection in the building based on the detection data obtained from each of the pathogen detectors, the locations, and a number of instances of detection of the pathogen in the building. In some embodiments, the magnitude of pathogen detection defines a severity of pathogen outbreak in the building. In some embodiments, the processing circuitry is configured to determine the responsive action based on the detection data, the magnitude of pathogen detection, and the number of instances of detection of the pathogen in the building.

In some embodiments, the detection data indicates a severity of pathogen outbreak in the building and a locality of areas of the pathogen outbreak in the building. In some embodiments, the responsive action includes at least one of a messaging action, a control action, an analytics action, a monitoring action, a service application action, or an alert action.

In some embodiments, the processing circuitry includes a messaging system configured to perform the messaging action. In some embodiments, the messaging system is configured to provide a message to one or more individuals associated with the building according to the magnitude of locality to notify the one or more individuals regarding pathogen detection in the building.

In some embodiments, the processing circuitry includes a control system. In some embodiments, the control system is configured to initiate one or more infection control sequences through operation of an infection control system of the building to perform the control action. In some embodiments, the one or more infection control sequences include an adjustment to a fresh air intake of an air handling unit (AHU) of a heating, ventilation, or air conditioning (HVAC) system of the building. In some embodiments, the one of or more infection control sequences include activation of one or more ultraviolet (UV) lights to disinfect return air from a zone of the building. In some embodiments, the one or more infection control sequences include initiating one or more filtration techniques to filter air in the building.

In some embodiments, the processing circuitry further includes an analytics system configured to adjust a predictive infection model based on the detection data to improve an accuracy of the predictive infection model to perform the analytics action.

In some embodiments, the processing circuitry further includes a monitoring system configured to generate a dashboard for presentation to a user or building administrator based on the detection data to perform the monitoring action.

In some embodiments, the processing circuitry further includes a service application system configured to identify one or more service opportunities based on the detection data, and schedule the one or more service opportunities to perform the service application action.

In some embodiments, the processing circuitry further includes an alert system configured to activate one or more aural alert devices or visual alert devices of the building to notify occupants of the building regarding detection of the pathogen or a policy change of the building to perform the alert action.

In some embodiments, the responsive action is targeted to an area or zone of the building where the pathogen is detected.

Another implementation of the present disclosure is a pathogen detection system for a building, according to some embodiments. In some embodiments, the pathogen detection system includes processing circuitry configured to obtain detection data from multiple pathogen detectors positioned in the building at multiple locations. In some embodiments, the pathogen detectors are configured to detect a presence of a pathogen, and a type of the pathogen. In some embodiments, the processing circuitry is further configured to determine a responsive action based on the detected presence of the pathogen, and the locations. In some embodiments, the responsive action includes a magnitude of effect determined based on the type of the pathogen and a number of instances of pathogen detection. In some embodiments, the processing circuitry is configured to determine which areas of the building the responsive action should affect based on the locations of the plurality of pathogen detectors that detect the presence of the pathogen. In some embodiments, the processing circuitry is configured to perform the responsive action or initiate the responsive action.

In some embodiments, the magnitude of effect of the responsive action is an expected infection risk reduction that results from performing the responsive action. In some embodiments, the processing circuitry is configured to determine the responsive action that has a desired value of the expected infection risk based on a type of pathogen detected and a number of instances of detection of the pathogen in the building.

In some embodiments, the responsive action includes at least one of a messaging action, a control action, an analytics action, a monitoring action, a service application action, or an alert action. In some embodiments, the processing circuitry is configured to at least one of perform the messaging action, perform the control action, perform the analytics action, perform the monitoring action, perform the service application action, or perform the alert action. In some embodiments, the processing circuitry is configured to provide a message to one or more individuals associated with the building according to the magnitude of locality to notify the one or more individuals regarding pathogen detection in the building. In some embodiments, the processing circuitry is configured to initiate one or more infection control sequences through operation of an infection control system of the building to perform the control action. In some embodiments, the one or more infection control sequences include at least one of an adjustment to a fresh air intake of an air handling unit (AHU) of a heating, ventilation, or air conditioning (HVAC) system of the building, activation of one or more ultraviolet (UV) lights to disinfect return air from a zone of the building, or initiating one or more filtration techniques to filter air in the building. In some embodiments, the processing circuitry is configured to adjust a predictive infection model based on the detection data to improve an accuracy of the predictive infection model to perform the analytics action. In some embodiments, the processing circuitry is configured to generate a dashboard for presentation to a user or building administrator based on the detection data to perform the monitoring action. In some embodiments, the processing circuitry is configured to identify one or more service opportunities based on the detection data, and schedule the one or more service opportunities to perform the service application action. In some embodiments, the processing circuitry is configured to activate one or more aural alert devices or visual alert devices of the building to notify occupants of the building regarding detection of the pathogen or a policy change of the building to perform the alert action.

In some embodiments, the responsive action is targeted to an area or zone of the building where the pathogen is detected.

Another implementation of the present disclosure is a method for detecting and responding to a pathogen in a building, according to some embodiments. In some embodiments, the method includes obtaining detection data from multiple pathogen detectors positioned in the building at multiple locations. In some embodiments, the detection data includes a detected type and presence of the pathogen in the building. In some embodiments, the method includes determining a responsive action based on the detected type and presence of the pathogen in the building. In some embodiments, the method includes determining which areas of the building that the responsive action should affect based on the locations of the pathogen detectors that detect the presence of the pathogen. In some embodiments, the method includes performing or initiating the responsive action.

In some embodiments, the areas of the building that the responsive action should affect are determined based on locations of the building that the pathogen detectors monitor for the pathogen.

In some embodiments, the pathogen detectors are positioned at least one of proximate an entrance of the building, in a high-traffic area of the building, within a return air vent of the building, in a room of the building, or in a sewage line of the building.

DETAILED DESCRIPTION

Overview

Referring generally to the FIGURES, systems and methods for a pathogen detection system for a building are shown. The pathogen detection system can include pathogen detectors positioned throughout the building that are configured to sense a presence and/or a type of pathogen in the building. A detection controller can obtain detection results from each of the pathogen detectors. The detection controller can determine a magnitude or severity of pathogenic outbreak in the building, and determine one or more responsive actions based on any of, or any combination of, pathogen detection, locations of pathogen detection in the building, a type of pathogen detected in the building, a number of instances of pathogen detection, the magnitude or severity of the pathogenic outbreak in the building, etc. The detection controller can communicate with a variety of systems of the building, systems associated with the building, sub-systems, etc., to implement the responsive actions. The responsive actions may differ based on application of the systems and methods (e.g., different types of buildings or facilities in which the systems and methods are implemented). The responsive actions can be applied across the entire building, or may be targeted to specific zones, areas, or locations in the building (based on the locations of pathogen detection in the building).

Building HVAC Systems and Building Management Systems

Figure 1:
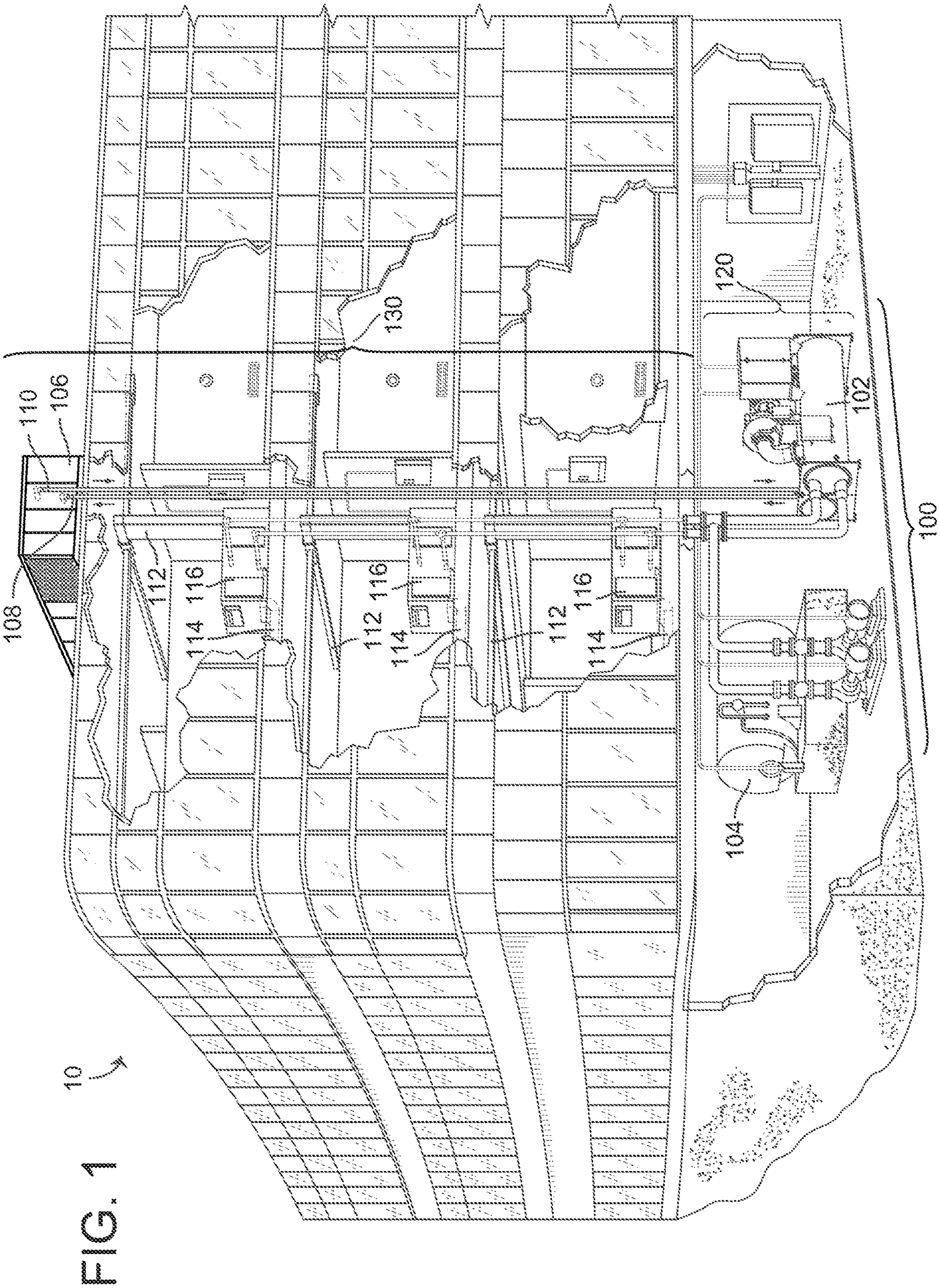
FIG. 1 is a drawing of a building equipped with a HVAC system, according to some embodiments.
Figure 2:
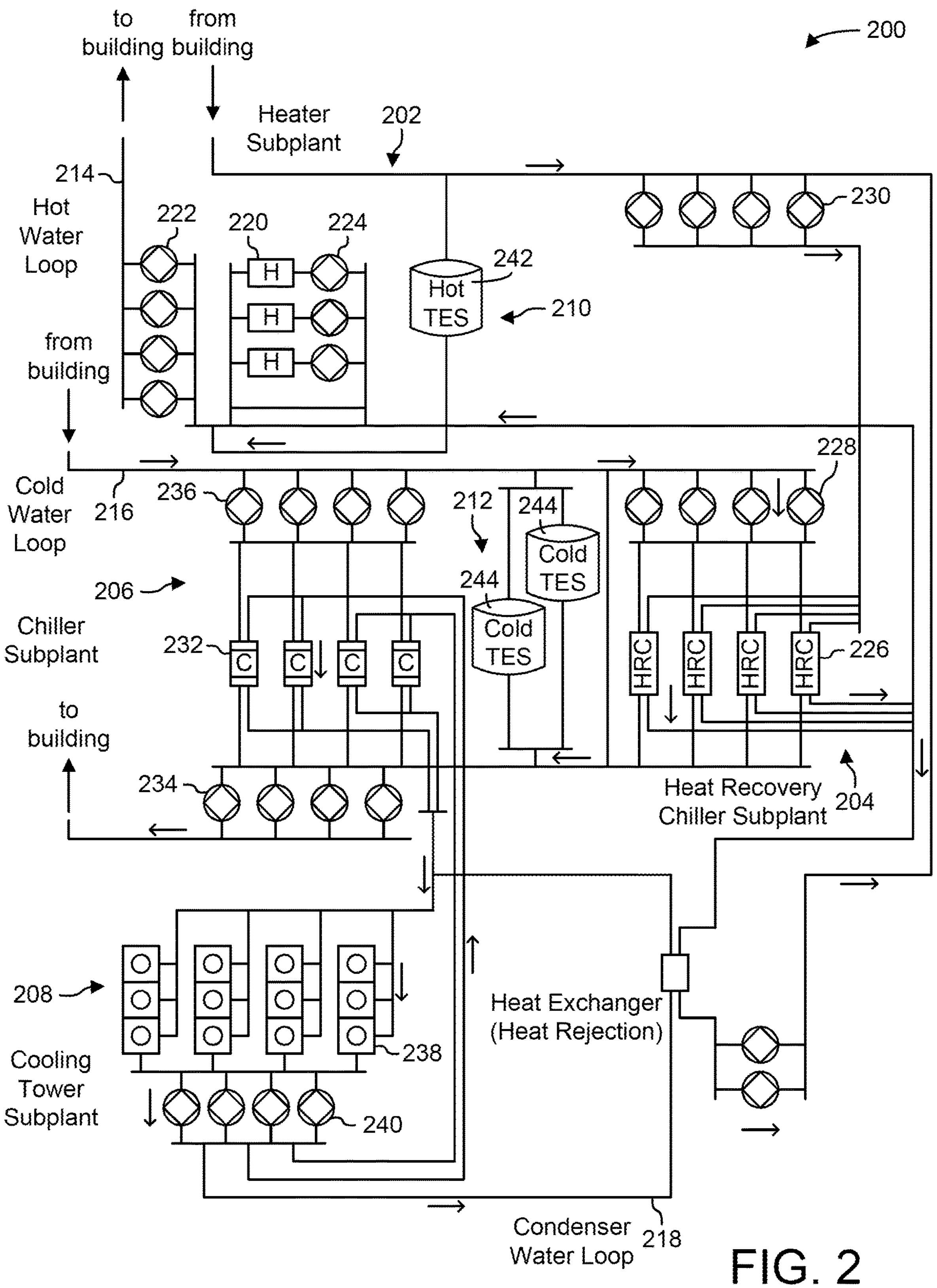
FIG. 2 is a block diagram of a waterside system which can be used to serve the building of FIG. 1, according to some embodiments.
Figure 3:
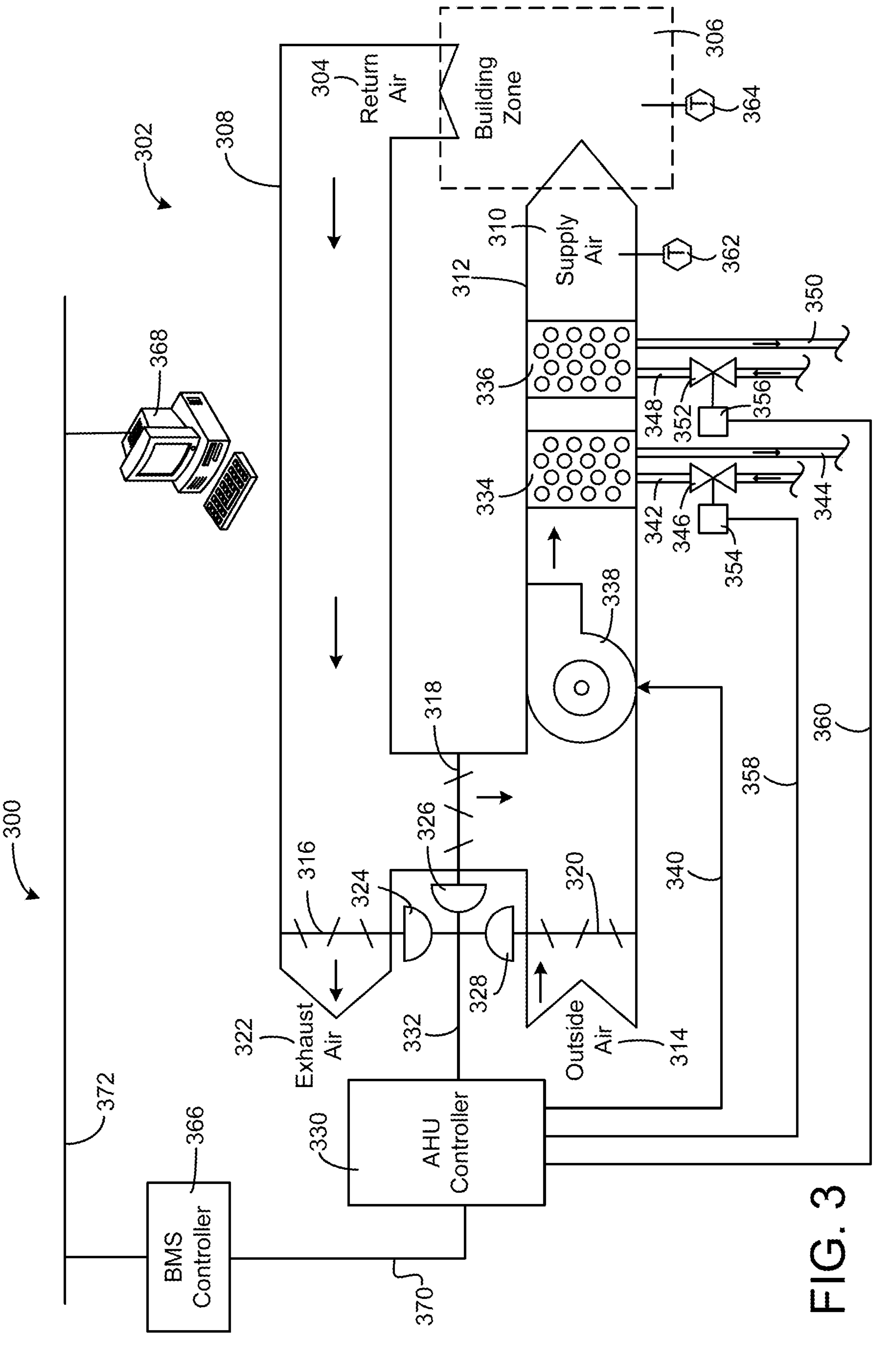
FIG. 3 is a block diagram of an airside system which can be used to serve the building of FIG. 1, according to some embodiments.
Figure 4:
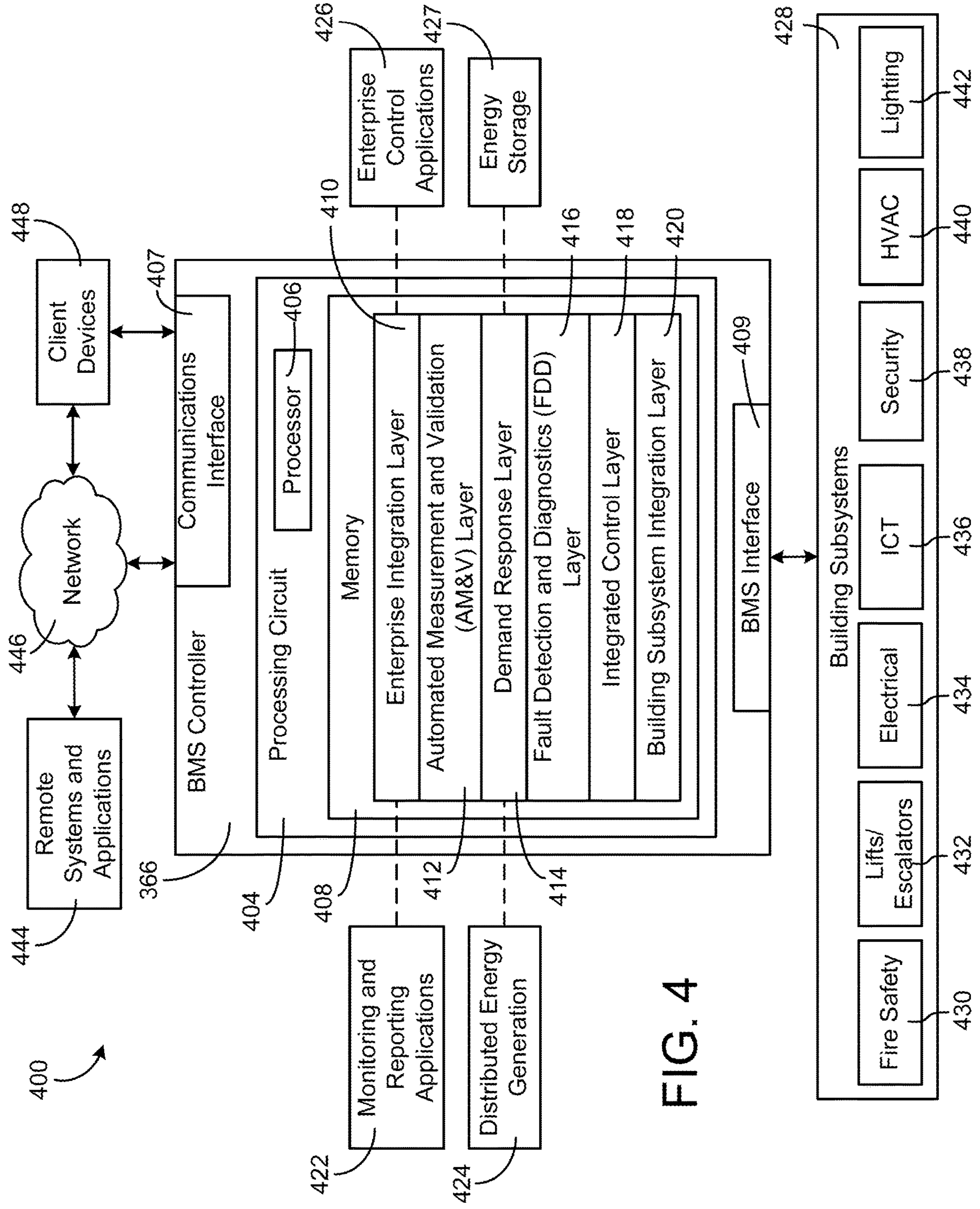
FIG. 4 is a block diagram of a building management system (BMS) which can be used to monitor and control the building of FIG. 1, according to some embodiments.
Figure 5:
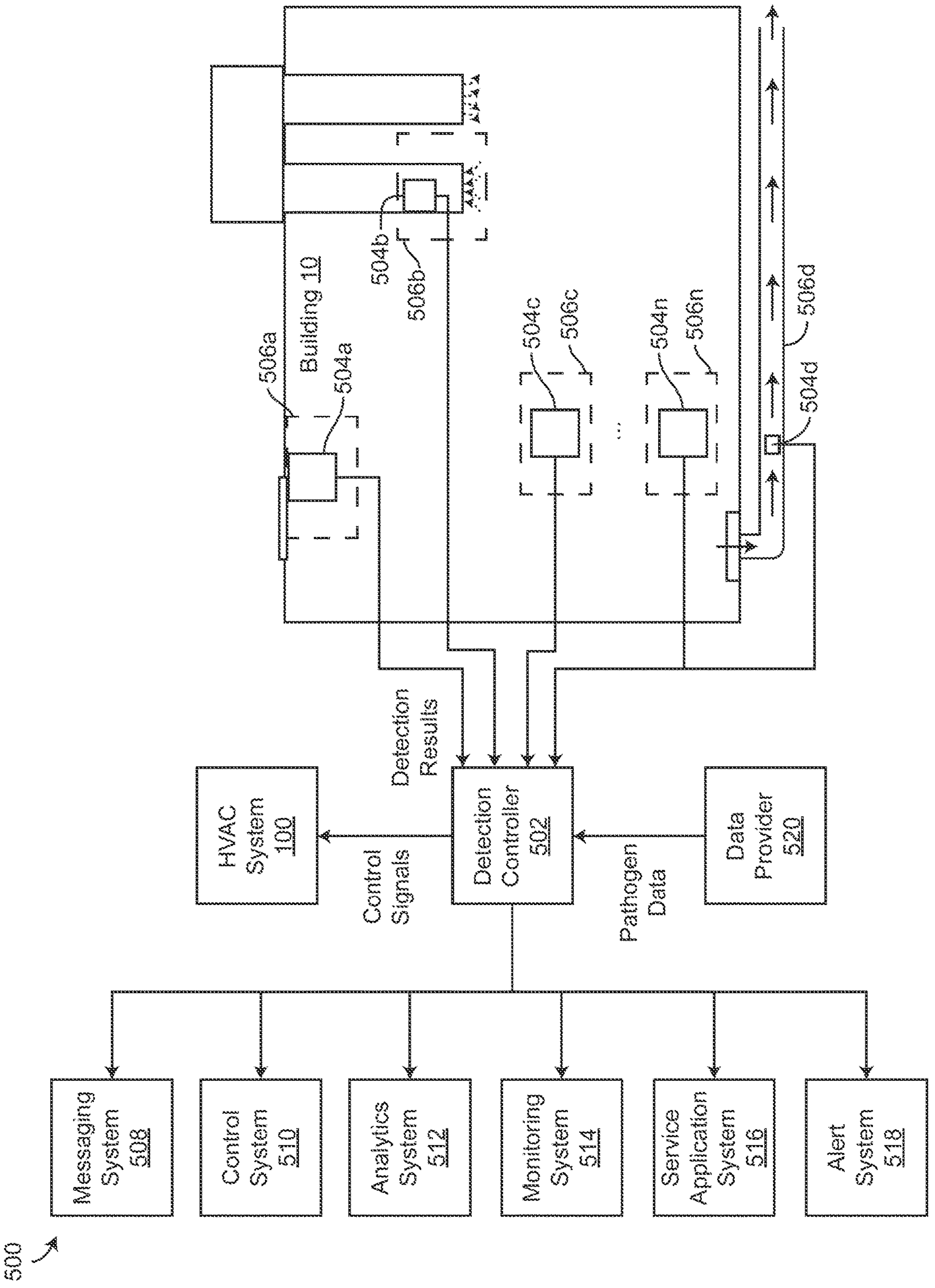
FIG. 5 is a block diagram of a pathogen detection system for a building, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Pathogen Detection System

Referring now to FIG. 5, a pathogen detection system 500 for building 10 is shown, according to some embodiments. Any of the functionality of pathogen detection system 500 as described herein may be implemented in any of the BMS as described in greater detail above with reference to FIGS. 1-4. As shown in FIG. 5, the pathogen detection system 500 includes multiple pathogen detectors 504 that are positioned throughout building 10. The pathogen detectors 504 (e.g., sensors, sensing elements, etc.) can be configured to detect a presence and/or a type of pathogen (e.g., an airborne pathogen, DNA, RNA, etc.) within the building 10. The pathogen detectors 504 can be positioned in different zones 506 of the building, or may be integrated within components of the HVAC system 100 that serves the building 10. It should be understood that while the detection controller 502 as described herein obtains pathogen detection data from pathogen detectors 504, the detection controller 502 can also obtain temperature, humidity, occupancy, carbon dioxide, indoor air quality, etc., or any other sensor data from sensors within the building 10 and use such sensor data to determine appropriate responses, identify high risk areas, generate dashboards, perform control operations, provide notifications to occupants, etc. The pathogen detectors 504 can be communicably coupled via a wired connection with the detection controller 502, or wirelessly (e.g., by communicating with the detection controller 502 via Bluetooth, LoRa, Zigbee, via cellular communications, a wireless network, a building WiFi network, etc.).

For example, the pathogen detectors 504 can be configured to identify RNA and/or DNA of a pathogen of interest (e.g., influenza, COVID-19 or a particular strain thereof, Ebola, etc.). The pathogen detectors 504 may collect air samples of different particulate matter or pathogens on a sample strip of the pathogen detectors 504 that can be analyzed to determine a presence of a pathogen of interest (or a presence of one or more pathogens of interest). In some embodiments, the pathogen detectors 504 are configured to provide results to a detection controller 502 of the pathogen detection system 500 after a processing of the samples obtained is completed. The processing of the pathogen detectors 504 may extend over a 6-18 hour period. In some embodiments, the processing of the pathogen detectors 504 may extend over a 24 hour period. In some embodiments, the processing of the pathogen detectors 504 may extend over a 1 hour period or a 30 minute period. Results of the processing of the pathogen detectors 504 can be provided to the detection controller 502 as detection signals when available. The pathogen detectors 504 can include processing circuitry, various processors, memory, etc., for performing the processing of the samples. In some embodiments, the pathogen detectors 504 are configured to provide the results of the processing to the detection controller 502 in real-time. In some embodiments, the pathogen detectors 504 utilize techniques for detecting pathogens, infectious quanta, etc., as described in greater detail in PCT/US2021/062444, filed Dec. 8, 2021, the entire disclosure of which is incorporated by reference herein.

The pathogen detectors 504 can be configured to detect a single type of pathogen, and may output an indicator of detection and the type of pathogen detected to the detection controller 502, according to some embodiments. In some embodiments, the pathogen detectors 504 are configured to detect multiple types of pathogens, such as by including multiple types of pathogen detectors or sensors on a single pathogen detector 504. In some embodiments, the pathogen detectors 504 are re-configurable to detect different types of pathogens such as through a module interface that allows for selective attachment or coupling of various adapters or sensors, each configured to allow the pathogen detector 504 to detect a different type of pathogen. The pathogen detectors 504 can include any combination of single-pathogen detectors, multiple pathogen detectors, modular pathogen detectors, etc.

The pathogen detectors 504 can be positioned throughout the building 10 at different locations. For example, a first pathogen detector **504*a* may be positioned in a zone 506*a* proximate an entrance of the building 10. Similarly, a second pathogen detector 504*b* can be positioned at a zone 506*b* within an AHU return line (e.g., return piping of AHU 106). For example, the AHU 106 may include a collection pipe with holes directed into air streamlines to allow the pathogen detector 504*b* to obtain a representative sample of return air from a zone of the building 10). A third pathogen detector 504*c* may be positioned in a zone 506*c* of the building 10 where responsive actions can be taken (e.g., alerts, disinfection operations, pathogen reduction control, etc.). A fourth pathogen detector 504*d* can be positioned in a sewage line 506*d* of the building 10. The pathogen detector 504*d* (or any of the other pathogen detectors 504 described herein) can use quick polymerase chain reaction (qPCR) functionality to detect the presence of a pathogen. An nth pathogen detector 504*n* can be positioned in a zone 506*n* that is a key focus space (e.g., an area of the building 10 where pathogen detection may be likely to occur, a highly populated or high traffic area of the building 10 such as a restroom of the building 10, a choke point of the building 10 where occupant density is high, an isolated room or zone of building 10, etc.). In some embodiments, the detectors 504 are configured to use electro-chemical means to detect a pathogen or a virus. In some embodiments, the pathogen detectors 504 are configured to detect pathogens or viruses on a surface. In some embodiments, the pathogen detectors 504 are configured to detect airborne pathogens or viruses. In some embodiments, the pathogen detectors are configured to sample particles in the air of the building 10 which is then fed into a qPCR detection apparatus. In some embodiments, the pathogen detectors 504 are or include Coriolis micro-microbial air samplers that are configured to detect a presence of a pathogen. In some embodiments, the pathogen detectors 504** are configured to use real-time PCR detection techniques to detect a presence of a pathogen or a virus.

In some embodiments, at least one pathogen detector 504 is positioned at one or more entrances, exits, or access points of the building 10. In some embodiments, at least one pathogen detector 504 is positioned at every entry area where employees typically badge in (e.g., scan a badge at a card reader) of the building 10 or a facility. The pathogen detectors 504 may be configured to periodically sample air in the entry area at periodic intervals (e.g., every 30 minutes). In some embodiments, a time at which each air sample is obtained is also recorded (e.g., a time-stamp). In some embodiments, the detection controller 502 is configured to communicate with the pathogen detectors 504 and also with an access or security system of the building 10 that includes the card reader where the employees or occupants scan their badges to access the building. The detection controller 502 can use the recorded times at which the air samples are obtained by the pathogen detectors (and therefore the detection results) in combination with a number of badge logs scanned by the card reader at the same time, or within a same time window. For example, if the air sample obtained by the pathogen detectors 504 at a particular entrance from 9:30 AM to 10 AM indicates pathogen detection, the number of badge logs may be correlated to the air samples. The detection controller 502 can then identify identities of different occupants who entered the building between the times from 9:30 AM to 10 AM (when the pathogen is detected). The detection controller 502 may operate as described herein to request that these individuals be tested (e.g., to determine if the individuals are infected or carrying the pathogen).

In some embodiments, the periodic interval is adjusted in real-time based on a number of employees entering the building 10. For example, the detection controller 502 may identify, based on a number of badge swipes at the entrance, in response to pressure sensors within a floor at an entrance, based on camera data, based on sensor data from a door sensor, etc., a traffic level through the entrance of the building 10 where one or more pathogen detectors 504 are located. If the traffic level indicates a high amount of traffic, the detection controller 502 may update the periodic interval or initiate pathogen detection so that detection results are obtained from the pathogen detectors 504 (e.g., changing the periodic interval from 30 minutes to 25 minutes, initiating the pathogen detectors 504 to begin sampling air based on the traffic level, etc.). Similarly, if the traffic level indicates a low amount of traffic, the detection controller 502 may update the periodic interval of the pathogen detectors 504 so that detection results are obtained from the pathogen detector 504 less frequently (e.g., changing the periodic interval from 30 minutes to 45 minutes) or may shut-off pathogen detection (e.g., shutting off operation of the pathogen detectors 504 based on the traffic level). In this way, the pathogen detection or operation of pathogen detectors 504 thereof may be triggered additionally or alternatively based on traffic level and/or based on a periodic interval. For example, the pathogen detectors 504 may obtain air samples in response to a predetermined number of people passing through the entry (e.g., every 20 individuals, every 50 individuals, etc.) instead of according to a periodic time interval.

It should be understood that in various embodiments, the pathogen detection system 500 can be configured to operate the pathogen detectors 504 to test for pathogens based on a time interval (e.g., a variable based time interval, a periodic interval, based on traffic level, etc.) and/or based on a number of detected people (e.g., also variable based) passing through the entrance, some combination thereof, or may switch between the two (e.g., periodically sampling and testing during low traffic level, and sampling based on a number of occupants that have entered the building during high traffic level or different times of day when traffic level is high). Advantageously, these techniques can facilitate better resolution of pathogen detection at busy times (e.g., before a shift starts in the building 10 when traffic is expected to be high), as well as to save expenses associated with operating the pathogen detectors 504 at lower traffic times.

In some embodiments, since most employees may enter the building 10 prior to a beginning of a shift, and there may be limited value in re-testing individuals as they leave and re-enter the building 10, the detection controller 502 and the pathogen detectors 504 can be configured to sample at times of day when shift changes are expected. In some embodiments, the detection controller 502 can use a scheduled occupancy (e.g., scheduled shifts) of the building 10 to determine when the shift changes are expected, or more generally, to determine when higher traffic will occur, and thereby decrease the periodic interval at which pathogens are detected to achieve a higher resolution of pathogen detection. For example, if the building 10 is a factory, the detection controller 502 and the pathogen detectors 504 may be configured to only obtain air samples at the beginning of a shift, or at known shift changes. Similarly, if the building 10 is an office building, the detection controller 502 and the pathogen detectors 504 may focus on obtaining air samplings in the morning (e.g., 7 AM to 10 AM).

In this way, the locations of the pathogen detectors 504 throughout building 10 can be designed to detect pathogen presence in an intelligent manner, based on areas of interest, or in a zone-by-zone manner so that a location of the pathogen can be detected in addition to a presence of a pathogen. In some embodiments, one or more of the pathogen detectors 504 are positioned on a mobile or portable device that is configured to translate or travel throughout the building 10. For example, the portable device may be configured to move through the building 10, while providing the detection controller 502 with real-time pathogen detection results, and providing the detection controller 502 with a real-time location of the portable device in the building 10. In this way, the portable device may seek or "sniff" for pathogens throughout the building 10 and provide the detection controller 502 with detection results so that a location of a pathogen within the building 10 can be determined. The building 10 can be retrofit with the pathogen detectors 504 being placed in areas of interest, highly populated areas of the building, areas of the building where a pathogen would be likely to be detected, etc.

Detection controller 502 is configured to obtain the detection results from any of the pathogen detectors 504 when results are available from the pathogen detectors 504 (e.g., in a real-time basis, in near-real time, in 24 hour intervals, etc.). Detection controller 502 can obtain the detection results and analyze the detection results to identify if a pathogen is detected in the building 10, a type of pathogen that is detected in the building 10, and/or a location of the detected pathogen in the building 10. The detection controller 502 can be configured to use known locations of the different pathogen detectors 504 and generate appropriate data (e.g., commands, analytical data, control signals, alert data, etc.) for any of a messaging system 508, a control system 510, an analytics system 512, a monitoring system 514, one or more service application system 516, and/or an alert system 518, etc., to perform one or more responsive actions in response to detecting a presence of a pathogen in the building 10. In some embodiments, the detection controller 502 is also configured to generate and/or provide control signals to the HVAC system 100 of the building 10. In some embodiments, the detection controller 502 is configured to determine and provide informative data for the HVAC system 100 for use by the HVAC system 100 in determining control operations thereof. In some embodiments, the detection controller 502 provides different data to any of the messaging system 508, the control system 510, the analytics system 512, the monitoring system 514, the service application system 516, and/or the alert system 518 based on a type of pathogen that is detected, and/or a location of where in the building 10 the pathogen is detected. This may result in different responsive actions for the detection of different types of pathogens. Certain pathogens may result in the detection controller 502 initiating more drastic responsive actions (e.g., evacuation and/or closure of a space), while other pathogens may result in the detection controller 502 initiating less drastic responsive actions (e.g., user alerts, cleaning of space, etc.).

In some embodiments, the detection controller 502 is located on-site at building 10. In some embodiments, any of the systems 508-518 are located off-site (e.g., in a cloud computing system as part of a service). In some embodiments, the detection controller 502 is also located off-site (e.g., in a cloud computing system) and communicates with the pathogen detectors 504 to obtain detection results.

In some embodiments, the detection controller 502 is also configured to determine a magnitude of the pathogen detection based on the detection results provided by the pathogen detectors 504. The magnitude of the pathogen detection can result in different responsive action being performed, thereby achieving appropriate responsive actions for the magnitude of the pathogen detection. For example, a single detection of influenza may result in a lower magnitude response than multiple detections of a particular strain of COVID-19, which may result in different responsive actions. The magnitude of the pathogen detection can be based on any of a number of positive detections of a pathogen (as indicated by the detection results), a type of pathogen that is detected, a location where the pathogen is detected in the building 10, etc., or any combination thereof. For example, if a pathogen is detected in an isolated room that can be easily sealed off (e.g., a nursing station, a sick room, etc.), the magnitude of the pathogen detection (and therefore a magnitude of the responsive actions) may be lower than a magnitude of a pathogen detection where multiple detections of a particular strain of COVID-19 are detected at a highly populated area of the building 10. Advantageously, the known locations of the pathogen detectors 504, and known architecture of the building 10 can facilitate accurate determination of the magnitude of the pathogen detection. The detection controller 502 can also be configured to obtain sensor data from any occupant sensor (e.g., a motion detector, a camera, lighting statuses, etc.) throughout the building 10 to aid in determining if the pathogen detectors 504 indicate the detection of a pathogen in a highly populated area of the building 10. The detection controller 502 can be configured to obtain occupant data from any number of occupant sensors and use the occupant data to determine the magnitude of the pathogen detection (e.g., determining a higher magnitude of the pathogen detection if the pathogen is detected in an area which the occupant data indicates is highly or densely populated).

In some embodiments, the detection controller 502 is configured to receive pathogen data from a data provider 520. The data provider 520 can be a government or clinical database configured to provide seasonal pathogen data (e.g., current types of strains, etc.) and/or a number of local infections in the area as the pathogen data. The detection controller 502 may adjust pathogen monitoring schemes based on the pathogen data.

Referring still to FIG. 5, the detection controller 502 can be configured to operate the messaging system 508 or initiated one or more operations to be performed by the messaging system 508. For example, if the detection controller 502 determines, based on the detection results provided by the pathogen detectors 504, that a pathogen has been detected in the building 10, or in a particular area of the building 10, the detection controller 502 may initiate or operate the messaging system 508 to provide emails, alerts, text messages, automated phonecalls, notifications via a mobile application, etc., to one or more occupants, employees, service technicians, etc., of the building 10 or of the particular area of the building 10 where the pathogen is detected. The messages generated by the messaging system 508 can include notifications, recommendations, or commands that the occupants, employees, service technicians, etc., stay at home and do not enter the building 10 due to a detection. The messaging system 508 can also generate messages for cleaning crews or employees of the building 10, notifying the cleaning crews or employees regarding a type of pathogen that has been detected in the building 10, and a location in the building 10 where the pathogen has been detected. The cleaning crews can then use this knowledge to perform appropriate cleaning actions at the location of the building 10 where the pathogen has been detected and/or to use appropriate cleaning procedures based on the type of pathogen detected in the location.

Referring still to FIG. 5, the detection controller 502 can be configured to operate the control system 510 and/or initiate one or more actions of the control system 510. The detection controller 502 may provide any of, or any combination of, the detection results, a magnitude of pathogen detection, a type of pathogen detected, a location in the building 10 where pathogen detection has occurred, a number of instances of the detected pathogen in the building 10, etc. The control system 510 can be configured to use any of the detection results, the magnitude of the pathogen detection, the type of pathogen detected, the location in the building 10 where pathogen detection has occurred, the number of instances of the detected pathogen in the building 10, etc., in a high level control logic application to determine when to activate and deactivate infection control sequences, and/or to target infection control sequences to provide infection control to the location in the building 10 where the pathogen is detected. In some embodiments, the infection control sequences include any of, or any combination of, drawing fresh outdoor air (e.g., increasing an air-intake fraction) to improve fresh air ventilation, operating one or more filtration devices (e.g., filtration devices positioned locally in the building 10, filtration devices positioned in the HVAC system 100 of the building 10, etc.), and/or operating one or more ultraviolet (UV) lights to provide infection control.

In some embodiments, the control system 510 is configured to use the magnitude of the pathogen detection as provided by the detection controller 502 to determine an appropriate infection control sequence. For example, a higher magnitude of the pathogen detection may result in the control system 510 implementing a more aggressive infection control sequence, whereas a lower magnitude of the pathogen detection may result in the control system 510 implementing a less aggressive infection control sequence. The control system 510 can also use the location of the detected pathogens to target initiation of the various infection control sequences to the location in the building 10 where the pathogens are detected. For example, the control system 510 can implement UV light operation for various air ducts of an AHU that provide or recirculate air to the location in the building 10 where the pathogens are detected. Advantageously, the location of the pathogen detection may facilitate improved energy costs associated with the infection control sequences (e.g., by not activating infection control devices for areas of the building where the pathogen is not detected). In some embodiments, the control system 510 is also configured to adjust access to the building 10. For example, the control system 510 may be a portion of a security system of the building 10 or may be integrated within the security system of the building 10. The control system 510 can prevent additional occupants from entering zones or locations in the building 10 where the pathogen is detected. In some embodiments, the control system 510 is configured to use pathogen detection data obtained by the pathogen detectors 504 and/or any outputs of the detection controller 502 as inputs to, or to train models of the systems and methods described in greater detail in U.S. application Ser. No. 16/927,759, filed Jul. 13, 2020, the entire disclosure of which is incorporated by reference herein.

Referring still to FIG. 5, the detection controller 502 is configured to provide outputs to the analytics system 512, according to some embodiments. In some embodiments, the outputs provided from the detection controller 502 to the analytics system 512 are the same as the outputs provided by the detection controller 502 to the control system 510. The analytics system 512 is configured to use feedback regarding actually measured pathogens (e.g., the detection results) to validate and/or improve one or more prediction models (e.g., a Wells-Riley based prediction model such as for predicting concentration of infectious quanta). In some embodiments, the analytics system 512 can include a predictive model that is configured to combine both a deterministic prediction portion and a stochastic correction. The deterministic prediction portion can be based on various equations (e.g., the Wells-Riley equation), and the stochastic correction can be adjusted, generated, determined, updated, etc., based on the detection results provided to the analytics system 512 by the detection controller 502 to improve an accuracy of the predictive model. The stochastic correction may be an adaptive portion of the predictive model. The predictive model can be updated and provided to the control system 510 for use in initiating the infection control sequences. In some embodiments, the outputs provided by the detection controller 502 (e.g., any of the data gathered by the detection controller 502 from the detectors 504, or any of the responses performed and subsequently obtained data) may be used to calibrate, update, or be any other input to any of the models described in greater detail with reference to PCT/US2020/041845, filed Jul. 13, 2020, the entire disclosure of which is incorporated by reference herein.

In some embodiments, the analytics system 512 is configured to integrate with the security system of the building 10. For example, the analytics system 512 may use the location of the detected pathogens to deny entry access of the building 10 by additional occupants, to isolate zones or rooms where the pathogens are detected, and/or to initiate contact tracing before an individual is contagious.

In some embodiments, the analytics system 512 is configured to use the outputs of the detection controller 502 to determine if an “all-clear” condition has been met (e.g., to determine if the pathogen is no longer detected in the building 10). The analytics system 512 can continually receive the outputs of the detection controller 502 (e.g., the detection results) and if the outputs indicate that no pathogens, or a particular type of pathogen, has/have not been detected for a predetermined amount of time, the analytics system 512 may determine that the pathogen is no longer present in the building 10. The analytics system 512 may determine that the pathogen is no longer present in the building and can determine that the “all-clear” condition has been met. The analytics system 512 can function in cooperation with the messaging system 508 to send messages to various occupants or employees that the building 10 can once again be accessed in response to determining that the “all-clear” condition has been met. In some embodiments, the analytics system 512 functions in cooperation with the control system 510 to deactivate the infection control sequences, thereby conserving energy usage when the infection control sequences are not necessary. The “all-clear” condition may indicate that the building 10, or a space, zone, or area of the building 10 where a pathogen has been detected can be re-occupied.

In some embodiments, the analytics system 512 is configured to correlate individual or group identification numbers with an RNA or DNA sample of the detected pathogen to rapidly identify which occupants of the building 10 are carrying the pathogen. In some embodiments, the analytics system 512 only has access to the identification numbers if an occupant or individual opts to allow the analytics system 512 with such access.

Referring still to FIG. 5, the detection controller 502 is configured to provide the outputs to the monitoring system 514, according to some embodiments. In some embodiments, the monitoring system 514 includes, or is in communication with, one or more display devices, notification systems, etc. The monitoring system 514 may be a back-end monitoring system for an administrator of the building 10. In some embodiments, the monitoring system 514 communicates with any of the messaging system 508, the control system 510, the analytics system 512, the service application system 516, the alert system 518, the HVAC system 100, a BMS of the building 10, etc., so that the monitoring system 514 can obtain operational data thereof. In some embodiments, the monitoring system 514 is configured to generate dashboards, user-interfaces, graphical user interfaces, graphs, charts, diagrams, tabular data, etc., of any of the messaging system 508, the control system 510, the analytics system 512, the service application system 516, the alert system 518, the HVAC system 100, the BMS of building 10, and/or the detection controller 502 based on operational data, sensor data, analytic data, etc., thereof. For example, the monitoring system 514 can generate a dashboard that demonstrates what areas in the building 10 are currently or have previously undergone infection control, what type of pathogen is detected in any areas of the building, time series-data of pathogen detection in building 10, etc. In some embodiments, the monitoring system 514 is configured to use any of the data obtained by or determined by the detection controller 502 in combination with the techniques as described in U.S. application Ser. No. 16/927,281, filed Jul. 13, 2020, to generate visualizations or dashboards, the entire disclosure of which is incorporated by reference herein.

Referring still to FIG. 5, the detection controller 502 is configured to provide the outputs to the service application system 516, according to some embodiments. In some embodiments, the service application system 516 is configured to identify sales opportunities based on the outputs of the detection controller 502. For example, the service application system 516 can identify sales opportunities (e.g., service opportunities) such as dirty coils, dirty or slimy condensate pans, dirty filters, mold, excessive particulate matter or dust, etc. The service application system 516 can initiate a service (e.g., scheduling, contracting, etc.) to address to the different sales opportunities, according to some embodiments. In some embodiments, samples from the services are provided to a lab (e.g., mailed to a lab) for baseline assessment. When future services are scheduled and implemented, the service application system 516 can validate effectiveness of mitigation solutions performed at the building 10 relative to the baseline assessment using lab results of subsequently obtained samples. The service application system 516 can also optimize resource dispatching. For example, the service application system 516 can prompt technicians, work crews, individuals, etc., with proper skills, training, and equipment to address different identified sales opportunities (e.g., to clean filters of the HVAC system 100, to replace faulty UV lights, etc.). In some embodiments, the service application system 516 is configured to perform an optimization to determine optimal scheduling of work crews or technicians to address the different sales opportunities.

In some embodiments, the outputs of the detection controller 502 are used by various miscellaneous systems or to perform miscellaneous responsive actions. For example, the outputs of the detection controller 502 can be used to determine if infection control should be included in action priority (e.g., codes, standards, etc.). In this way, infection control may be prioritized appropriately (e.g., as a top priority) amongst other priorities such as energy efficiency, convenience, occupant comfort, etc. The systems and methods described herein can also facilitate economic advantages such as reducing insurance premiums due to the active monitoring of pathogens and the active mitigation of pathogens in the building 10.

Referring still to FIG. 5, the detection controller 502 is configured to provide the outputs to the alert system 518, according to some embodiments. In some embodiments, the alert system 518 is a controller or a control device of an alert system of the building 10. The alert system can include various aural alert devices (e.g., alarms, speakers, sirens, etc.) positioned throughout the building 10 and/or visual alert devices (e.g., warning lights, display screens, etc.) positioned throughout the building 10. The detection controller 502 can operate the alert system 518 in response to detecting a pathogen, a particular type of pathogen, a number of pathogen detection instances greater than a threshold, a magnitude of the pathogen detection being above a threshold magnitude, etc. In some embodiments, the detection controller 502 is configured to operate the alert system 518 to provide visual and/or aural alerts in a location where the pathogen is detected. In this way, the alert system 518 can use the location of the detected pathogens to provide targeted alerts to occupants of the building 10. In some embodiments, the alert system 518 performs the responsive action by providing a visual alert regarding policy changes in the building 10 (e.g., prompting occupants to wear masks, prompting occupants from a location where a pathogen is detected to get tested, prompting occupants to ensure social distancing practices are followed, etc.).

Referring still to FIG. 5, the various systems (e.g., the messaging system 508, the control system 510, the analytics system 512, the monitoring system 514, the service application system 516, the alert system 518, etc.) may be components of the detection controller 502, or may be components of other processing circuitry (e.g., distributed processing circuitry, cloud computing systems, etc.) It should be understood that while detection controller 502 is described herein as determining responsive actions for each of the messaging system 508, the control system 510, the analytics system 512, the monitoring system 514, the service application system 516, the alert system 518, and the HVAC system 100, the detection controller 502 may, in some embodiments, be configured to only determine responsive actions for one or more of the messaging system 508, the control system 510, the analytics system 512, the monitoring system 514, the service application system 516, the alert system 518, etc.

Figure 6:
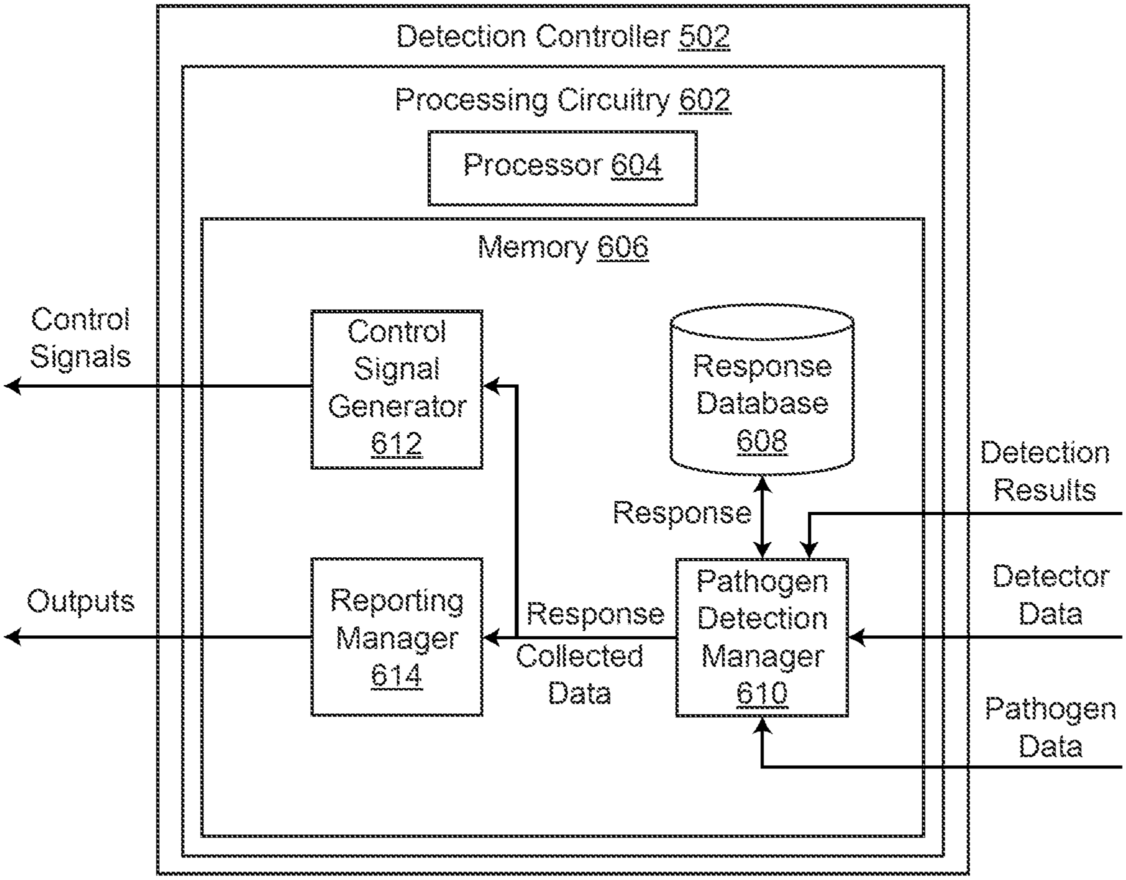
FIG. 6 is a block diagram of a detection controller of the pathogen detection system of FIG. 5, according to some embodiments

Referring particularly to FIG. 6, the detection controller 502 is shown in greater detail, according to some embodiments. The detection controller 502 is shown to include processing circuitry 602 including a processor 604 and memory 606. Processing circuitry 602 can be communicably connected to a communications interface such that processing circuitry 602 and the various components thereof can send and receive data via the communications interface. Processor 604 can be implemented as a general purpose processor, an application specific integrated circuit (ASIC), one or more field programmable gate arrays (FPGAs), a group of processing components, or other suitable electronic processing components.

Memory 606 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 606 can be or include volatile memory or non-volatile memory. Memory 606 can include database components, object code components, script components, or any other type of information structure for supporting the various activities and information structures described in the present application. According to some embodiments, memory 606 is communicably connected to processor 604 via processing circuitry 602 and includes computer code for executing (e.g., by processing circuitry 602 and/or processor 604) one or more processes described herein.

As shown in FIG. 6, memory 606 includes a response database 608, a pathogen detection manager 610, a control signal generator 612, and a reporting manager 614, according to some embodiments. The pathogen detection manager 610 is configured to receive detection results and pathogen data from the pathogen detectors 504, according to some embodiments. In some embodiments, the pathogen detection manager 610 is also configured to obtain detector data from each of the pathogen detectors 504. The detector data may include information regarding a type of detector, a location of the detector in the building 10, a model of the detector, installation data of the detector, measurement errors or uncertainties, control parameters, configuration data, etc. In some embodiments, the pathogen detection manager 610 is configured to determine or select an appropriate response from the response database 608 based on the detection results, pathogen data, and the detector data. For example, the pathogen detection manager 610 can be configured to determine a magnitude of the detection based on the detector data, according to some embodiments. In some embodiments, the detector data also includes a magnitude or level of indication of the detection at each of the detectors 504. The magnitude or level of indication of the detection can be a building-wide indication, a floor-wide indication, a zone-wide indication, a room-wide indication, etc., according to some embodiments. For example, a detector that is placed within a return air duct of the building 10 (e.g., detector 504*b*) that draws air from a zone including multiple rooms or sub-zones may report a zone-wide level of indication or magnitude, according to some embodiments. In another example, a detector that is placed within a sewage line of the building (e.g., detector 504*d*) that detects pathogens in sewage exiting the building 10 may report a building-wide level of indication or magnitude, according to some embodiments. In yet another example, a detector that is placed within a single room (e.g., detector 504*a*) may report a room-wide level of indication or magnitude, according to some embodiments. In this way, the positioning and configuration of the detectors can indicate a degree of locality (e.g., a spatialization) of pathogen detection in the building 10. The pathogen detection manager 610 may determine the degree of locality based on the detector data for each of the detectors 504, or may receive the degree of locality from each of the detectors 504.

The pathogen detection manager 610 can use any of the detection results (e.g., a general location of detection of a pathogen, a number of instances of detection), the detector data (e.g., the degree of locality of each of the detectors 504), and the pathogen data (e.g., a type of pathogen detected) to determine or select a response (e.g., a responsive action) from the response database 608. The pathogen detection manager 610 can select both a magnitude of the response and a locale magnitude of the response, according to some embodiments. In some embodiments, the magnitude of the response is a metric that is responsive to a severity of outbreak within the building. The magnitude of the response may be quantified based on a rated degree of intrusiveness to occupants of the building 10, an expected amount of energy consumption required to perform the response (e.g., using UV lights to reduce infection risks may require more energy consumption than increasing fresh air intake to reduce infection risks and thereby have a higher magnitude), and/or an expected infection risk reduction of performing the response. In some embodiments, the locale magnitude of the response indicates how many locations of the building 10 the response should affect. For example, the locale magnitude may indicate if the response should affect the entire building 10, a single room of the building 10, a zone of the building 10, multiple zones or rooms of the building 10, etc. In some embodiments, the locale magnitude is determined by the pathogen detection manager 610 based on the level of indication or magnitude of the detection by the detectors 504. For example, if a detector that monitors sewage exiting the entire building 10 detects of a pathogen, the pathogen detection manager 610 may determine that the response should affect the entire building 10 (e.g., changing a policy for the entire building 10, implementing a control sequence to affect the entire building 10, alerting all occupants of the entire building 10, etc.). Similarly, if a detector that monitors a return air in a duct that draws air from several zones of the building 10 detects a pathogen, the pathogen detection manager 610 may determine that the response should affect the several zones of the building 10 where the pathogen is detected.

In some embodiments, the pathogen detection manager 610 is configured to approximate a location or a range of locations in the building 10 based on the detector data and the detection results in which a particular pathogen may be present. The pathogen detection manager 610 can select or determine the response from the response database 608 and apply the response to the location or range of locations (e.g., initiate the response so that the response is performed) in response to the detection of the particular pathogen, according to some embodiments. In some embodiments, the pathogen detection manager 610 is configured to determine the magnitude of the response based on the pathogen data (e.g., based on the type of pathogen detected) and based on a number of instances of the pathogen being detected in the building 10. For example, if a particular pathogen such as COVID-19 is detected, the magnitude of the response may be relatively high, whereas if a different pathogen is detected, the magnitude of the response may be lower. Similarly, if a single instance of the pathogen is detected, the magnitude of the response may be lower than if multiple instances of the pathogen are detected. In this way, the response can have two properties—(i) a magnitude of the response itself that is quantified in terms of (a) invasiveness to the occupants of the building 10 (e.g., closing off an entire floor may be more invasive than prompting building staff to disinfect a particular area, requiring occupants of the building 10 to wear masks may be less invasive than prompting occupants to seek testing for infection but more invasive than initiating a control sequence to reduce infection risks), (b) expected energy or monetary expenditure required to perform the response, and/or (c) expected infection risk reduction resulting from performing the response, and (ii) a locale magnitude that quantifies a number of areas or spaces of the building 10 that the response is applied to (e.g., to a single floor, to a single room, to the entire building, to a zone of multiple areas of the building 10, etc.). The magnitude of the response may be determined or selected by the pathogen detection manager 610 based on the type of pathogen detected and/or a number of instances of detection of the pathogen, according to some embodiments. In some embodiments, the locale magnitude of the response is determined by the pathogen detection manager 610 based on which of the detectors 504 reports the detected pathogen, and which areas of the building 10 the detected pathogen may be present in based on the configuration of the detectors 504.

In some embodiments, the pathogen detection manager 610 is configured to provide the response and/or any of the collected data (e.g., from the detectors 504) to the reporting manager 614 and/or the control signal generator 612. The control signal generator 612 can generate control signals for equipment of the building 10 to implement the response, according to some embodiments. In some embodiments, the control signals are provided to the HVAC system 100 or to an infection risk reduction system so that the HVAC system 100 or the infection risk reduction system can operate to reduce infection risk inside of the building 10 by increasing fresh air intake, operating UV lights, operating in-zone filtration devices, etc. In some embodiments, the reporting manager 614 is configured to provide any of the response, the magnitude of the response, the locale magnitude of the response, or the collected data to any of the messaging system 508, the control system 510, the analytics system 512, the monitoring system 514, the service application system 516, or the alert system 518 so that the systems 508-518 can perform their respective functions.

Process

Figure 7:
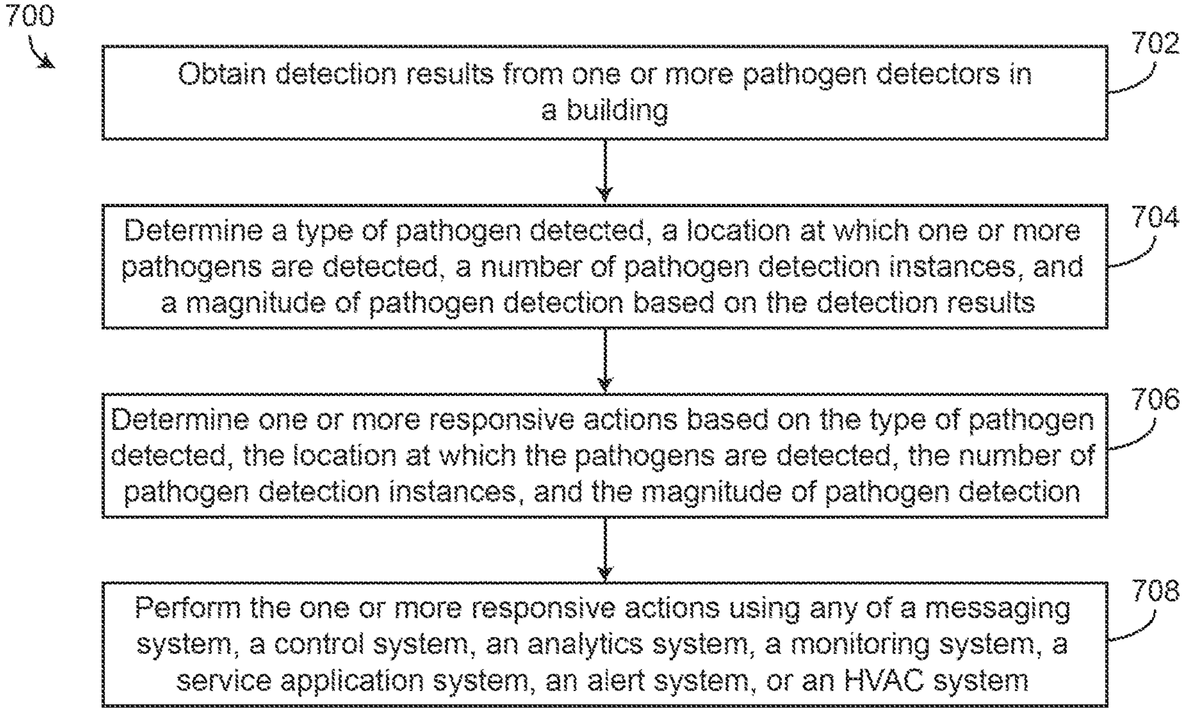
FIG. 7 is a flow diagram of a process for performing pathogen detection and responsive actions, according to some embodiments.

Referring to FIG. 7, a process 700 for performing pathogen detection for a building and performing one or more responsive actions is shown, according to some embodiments. The process 700 can be performed by the detection controller 502, and/or by the pathogen detection system 500 as described in greater detail above with reference to FIGS. 5-6. Process 700 includes steps 702-708, according to some embodiments. Process 700 can be performed using real-time or delayed pathogen detection results.

Process 700 includes obtaining detection results from one or more pathogen detectors in a building (step 702), according to some embodiments. The pathogen detectors can be pathogen detectors 504, according to some embodiments. In some embodiments, the pathogen detectors are or include static pathogen detectors (e.g., stationary and installed in a fixed location of the building). In some embodiments, the pathogen detectors are positioned at isolated rooms, entrances of the building, exits of the building, areas of the building with high expected occupancy density, etc. The pathogen detectors can also be positioned at areas of the building where pathogen detection is predicted to be high (e.g., in the bathroom, in a space of the building that is frequented by a large number of occupants, etc.). Locations of the pathogen detectors (e.g., floor, room, zone, etc.) may be known and can be used in steps 704-708, according to some embodiments. The pathogen detectors can also include a mobile unit including a pathogen detector that is configured to translate or move throughout the building, according to some embodiments. In some embodiments, step 702 is performed by the detection controller 502 and the pathogen detectors 504 as described in greater detail above with reference to FIGS. 5-6. Step 702 can also include obtaining seasonal infection or pathogen data for a region (e.g., a state, a country, a city, a country, a province, etc.) in which the building is located.

Process 700 includes determining a type of pathogen detected, a location at which one or more pathogens are detected, a number of pathogen detection instances, and a magnitude of pathogen detection based on the detection results (step 704), according to some embodiments. Step 704 can be performed by the detection controller 502, according to some embodiments. The type of pathogen detected may be an output of any of the pathogen detectors. For example, the type of pathogen may be a particular strain of a pathogen such as COVID 19, different strains of influenza, Ebola, etc., or any other pathogens (e.g., airborne pathogens) which the pathogen detectors are configured to detect. In some embodiments, the locations at which the pathogens are detected are determined based on known locations of the pathogen detectors. For example, if a particular pathogen detector has a unique identification, the detection controller 502 may use the unique identification and a database to identify the location of the pathogen detector. In some embodiments, the detection results (e.g., data provided by the pathogen detectors) include information indicating the location of each pathogen detector. For example, each pathogen detector may report (e.g., to the detection controller 502) its location in the building (e.g., the building 10).

In some embodiments, the location of the pathogen detector changes (e.g., if the pathogen detector is mounted on a device, apparatus, or unit configured to translate throughout the building). The pathogen detector may be configured to wirelessly communicate to provide current pathogen detection data and current location in the building (e.g., wirelessly communicate with the detection controller 502). In some embodiments, the number of pathogen detection instances is a number of pathogen detections of any type of pathogen across all of the pathogen detectors in the building, a number of a particular type of pathogen across all of the pathogen detectors in the building, a number of pathogen detections of a single or multiple of the pathogen detectors over a time period (e.g., a 24 hour period), a number of pathogen detections of any or a particular type of pathogen of pathogen detectors in a particular area, etc.

In some embodiments, the magnitude of the pathogen detection is a value that is determined to quantify a severity of the pathogen detection. The magnitude can be determined based on any of, or a combination of, the type of pathogen detected, the location at which one or more pathogens are detected, the number of pathogen detection instances, etc. In some embodiments, the magnitude is determined by the detection controller 502.

Process 700 includes determining one or more responsive actions based on the type of pathogen detected, the location at which the pathogens are detected, the number of pathogen detection instances, and the magnitude of pathogen detection (step 706), according to some embodiments. In some embodiments, step 706 is performed by the detection controller 502 and/or one or more systems, devices, etc., that are communicably coupled with the detection controller 502 (e.g., the messaging system 508, the control system 510, the analytics system 512, the monitoring system 514, the service application system 516, the alert system 518, the HVAC system 100, etc.). In some embodiments, the responsive actions are determined by the detection controller 502 and provided to appropriate external systems that are configured to perform the responsive actions. In some embodiments, determining the responsive action includes determining a magnitude of the responsive action and determining a locale magnitude of the responsive action. The locale magnitude can be determined based on a location or configuration of the detector at which the pathogen is detected, according to some embodiments. In some embodiments, the magnitude of the responsive action is determined based on the type of pathogen detected at the detectors 504 and the number of instances of pathogen detection in the building 10.

The responsive actions can include any of, or any combination of, messaging actions, control actions, analytics actions, monitoring actions, service application initiations, alerting actions, adjustments to an HVAC system of the building, etc. The messaging actions can include any of providing a text message, an email, a notification, etc., to one or more occupants of the building, occupants of a particular zone of the building (e.g., where the pathogen is detected), employees that work in the building, etc. The control actions can include activation and/or determination of one or more infection control sequences (e.g., activating UV lights to kill pathogens in the building, increasing a fresh-air intake fraction of an AHU of the building, advanced filtration techniques, etc.). The control actions can be targeted to affect a particular zone or area of the building (e.g., based on the location of the detected pathogens, and/or a type of the detected pathogens). In some embodiments, a magnitude of the infection control sequences to be implemented is determined based on the magnitude of the pathogen detection (e.g., the detection of certain types of pathogens may require additional infection control sequences, etc.). The analytics actions can include using the detection results (e.g., real-world detection results) to update or adjust a predictive model (e.g., a Wells-Riley based predictive model) for use in determining high level control decisions to mitigate infection risks in the building. For example, the predictive model can include a deterministic portion and a stochastic adjustment, with the stochastic adjustment being updated or changed based on the detection results.

The monitoring actions can include generation of dashboards, user interfaces, reporting data, tabular data, graphs, graphical data, graphical user interfaces, etc., of the building. The monitoring actions can also include generation of an operation of any other system associated with the building that may be relevant to pathogenic presence in the building (e.g., what control sequences are implemented, potential infection reduction techniques, occupancy data in the building or different zones of the building, etc.). The dashboards, reporting data, tabular data, graphs, etc., can be presented to an administrator of the building.

The service application actions can include identifying, based on outputs of step 704 (or the detection controller 502), one or more service opportunities, according to some embodiments. In some embodiments, the service application initiations include scheduling and contracting of one or more services to address the service opportunities. Data can be collected from the implementation of the one or more services to generate baseline data, and subsequent data to identify if infection control sequences that are implemented in the building are effective.

The alerting actions can include determining that alarms or alerts should be provided to occupants of the building, according to some embodiments. The alarms or alerts can be targeted to specific areas, zones, rooms, floors, etc., of the building where a pathogen is detected. The types of alarms or alerts can be determined based on the type of pathogen detected and/or the magnitude of the pathogen detection.

Process 700 includes performing the one or more responsive actions using any of a messaging system, a control system, an analytics system, a monitoring system, a service application system, and alert system, or an HVAC system (step 708), according to some embodiments. In some embodiments, step 708 is performed by any of the messaging system 508, the control system 510, the analytics system 512, the monitoring system 514, the service application system 516, the alert system 518, or the HVAC system 100 of the building 10 (shown in FIG. 5).

The responsive actions may differ based on different applications of the process 700 or the pathogen detection system 500. For example, if the building of process 700 is an airport, and a particular type of pathogen is detected in the airport, the responsive actions may include sealing off the airport, alerting nearby aircrafts, shutting off outgoing transit, etc. In another example, if the building is a hospital, and a particular type of pathogen is detected in a certain area (e.g., a patient's room), the room may be sealed off, or caregivers may be prompted to use proper safety precaution (e.g., proper safety attire) before entering the room where the particular type of pathogen is detected. In another example, if the building is an office building, the responsive actions can include notifying employees of the office building (e.g., by providing a message) that a particular type of pathogen has been detected, and that all employees should work from home, or perform self-imposed quarantining. The responsive actions can further include restricting access to the office building (e.g., through adjustments to a badge security system of the building) until proper cleaning procedures have been performed and until an "all-clear" condition has been met (e.g., after waiting a predetermined amount of time). The responsive actions can also include, in such an example, providing a notification to the employees of the office building when the "all-clear" condition is met and when the employees can return to the office building.

It should be understood that while steps 706-708 describe multiple different types of responsive actions, process 700 does not require all of the responsive actions to be determined and performed. In some embodiments, steps 706-708 only include one or more of the responsive actions for the messaging system, the control system, the analytics system, the monitoring system, the service application system, the alert system, or the HVAC system. For example, the responsive actions may only include messaging actions, and consequently step 708 only includes "perform the responsive action using the messaging system."

Example Applications

Referring generally to the FIGURES, the systems and methods described herein can be applied in a variety of applications or for different types of buildings. For example, the building 10 may be an airport, an incarceration site, a cruise ship, a hotel, a nursing home, an assisted living facility, etc. Depending on the type of the building 10 and the application thereof, the responsive actions initiated by the detection controller 502 may differ. For example, if the building 10 is an airport, one of the responsive actions may be to shut-down travel or delay flights in response to detecting a particular type of pathogen in the airport. Depending on the application, the responsive actions may differ. For example, at higher risk facilities of infection spread (e.g., nursing homes, assisted living homes, etc.) the responsive actions can include shutting down or limiting regular facility operations to limit or reduce infective spread.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A pathogen detection system for a building, comprising:

a plurality of pathogen detectors positioned in the building, the pathogen detectors configured to output detection data comprising a detected presence of a pathogen; and processing circuitry configured to:

obtain the detection data from the plurality of pathogen detectors;

determine, based on the detected presence of the pathogen and a type of the pathogen, whether to use ultraviolet (UV) light and air filtration or air filtration without UV light to disinfect air provided to the building as a responsive action; and perform the responsive action or initiate the responsive action.

2. The pathogen detection system of claim 1, wherein the plurality of pathogen detectors are positioned at least one of:

proximate an entrance of the building;
in a high-traffic area of the building;
within a return air vent of the building;
in a room of the building; or
in a sewage line of the building.

3. The pathogen detection system of claim 1, wherein the responsive action comprises a magnitude of effect, the magnitude of effect of the responsive action comprising an expected infection risk reduction that results from performing the responsive action, wherein the processing circuitry is configured to determine the responsive action that has a desired value of the expected infection risk based on a type of pathogen detected and a number of instances of detection of the pathogen in the building.

4. The pathogen detection system of claim 1, wherein the responsive action comprises a magnitude of locality, wherein the magnitude of locality defines a number of areas of the building affected by the responsive action, wherein the processing circuitry is configured to determine the magnitude of locality for the responsive action based on a location of the plurality of detectors that detect the pathogen.

5. The pathogen detection system of claim 1, wherein the processing circuitry is further configured to:
determine a magnitude of pathogen detection in the building based on the detection data obtained from each of the plurality of pathogen detectors, a plurality of locations at which the plurality of pathogen detectors are positioned, and a number of instances of detection of the pathogen in the building, the magnitude of pathogen detection defining a severity of pathogen outbreak in the building; and
determine the responsive action based on the detection data, the magnitude of pathogen detection, and the number of instances of detection of the pathogen in the building.

6. The pathogen detection system of claim 1, wherein the detection data indicates a severity of pathogen outbreak in the building and a locality of areas of the pathogen outbreak in the building.

7. The pathogen detection system of claim 1, wherein responsive action comprises a messaging action and the processing circuitry comprises a messaging system configured to perform the messaging action, the messaging system is configured to provide a message to one or more individuals associated with the building according to the magnitude of locality to notify the one or more individuals regarding pathogen detection in the building.

8. The pathogen detection system of claim 1, wherein the responsive action comprises a control action and the processing circuitry comprises a control system configured to initiate one or more infection control sequences through operation of an infection control system of the building to perform the control action, the one or more infection control sequences comprising at least one of an adjustment to a fresh air intake of an air handling unit (AHU) of a heating, ventilation, or air conditioning (HVAC) system of the building, activation of one or more ultraviolet (UV) lights to disinfect return air from a zone of the building, or initiating one or more filtration techniques to filter air in the building.

9. The pathogen detection system of claim 1, wherein the responsive action comprises an analytics action and the processing circuitry further comprises an analytics system configured to adjust a predictive infection model based on the detection data to improve an accuracy of the predictive infection model to perform the analytics action.

10. The pathogen detection system of claim 1, wherein the responsive action comprises a monitoring action and the processing circuitry further comprises a monitoring system configured to generate a dashboard for presentation to a user or building administrator based on the detection data to perform the monitoring action.

11. The pathogen detection system of claim 1, wherein the responsive action comprises a service application action and the processing circuitry further comprises a service application system configured to identify one or more service opportunities based on the detection data, and schedule the one or more service opportunities to perform the service application action.

12. The pathogen detection system of claim 1, wherein the responsive action comprises an alert action and the processing circuitry further comprises an alert system configured to activate one or more aural alert devices or visual alert devices of the building to notify occupants of the building regarding detection of the pathogen or a policy change of the building to perform the alert action.

13. The pathogen detection system of claim 1, wherein the responsive action is targeted to an area or zone of the building where the pathogen is detected.

14. A pathogen detection system for a building, comprising:
processing circuitry configured to:
obtain detection data from a plurality of pathogen detectors positioned in the building at a plurality of locations and configured to detect a presence of a pathogen, and a type of the pathogen;
determine which of a ventilation action, a filtration action, or a disinfection action using ultraviolet (UV) light to perform as a responsive action based on the detected presence of the pathogen, and the type of the pathogen;
determine which areas of the building the responsive action should affect based on the locations of the plurality of pathogen detectors that detect the presence of the pathogen; and
perform the responsive action or initiate the responsive action.

15. The pathogen detection system of claim 14, wherein the responsive action comprises a magnitude of effect determined based on the type of the pathogen and a number of instances of pathogen detection, wherein the magnitude of effect of the responsive action comprises an expected infection risk reduction that results from performing the responsive action, wherein the processing circuitry is configured to determine the responsive action that has a desired value of the expected infection risk based on a type of pathogen detected and a number of instances of detection of the pathogen in the building.

16. The pathogen detection system of claim 14, wherein the responsive action comprises at least one of a messaging action, a control action, an analytics action, a monitoring action, a service application action, or an alert action;
the processing circuitry is further configured to at least one of:
perform the messaging action, the messaging system configured to provide a message to one or more individuals associated with the building according to the magnitude of locality to notify the one or more individuals regarding pathogen detection in the building;
initiate one or more infection control sequences through operation of an infection control system of the building to perform the control action, the one or more infection control sequences comprising at least one of an adjustment to a fresh air intake of an air handling unit (AHU) of a heating, ventilation, or air conditioning (HVAC) system of the building, activation of one or more UV lights to disinfect return air from a zone of the building, or initiating one or more filtration techniques to filter air in the building;

adjust a predictive infection model based on the detection data to improve an accuracy of the predictive infection model to perform the analytics action;

generate a dashboard for presentation to a user or building administrator based on the detection data to perform the monitoring action;

identify one or more service opportunities based on the detection data, and schedule the one or more service opportunities to perform the service application action; and activate one or more aural alert devices or visual alert devices of the building to notify occupants of the building regarding detection of the pathogen or a policy change of the building to perform the alert action.

17. The pathogen detection system of claim 14, wherein the responsive action is targeted to an area or zone of the building where the pathogen is detected.

18. A method for detecting and responding to a pathogen in a building, the method comprising:

obtaining detection data from a plurality of pathogen detectors positioned in the building at a plurality of locations, the detection data comprising a detected type and presence of the pathogen in the building;

determining which of a ventilation action, a filtration action, or a disinfection action using ultraviolet (UV) light to perform as a responsive action based on the detected type and presence of the pathogen in the building;

determining which areas of the building that the responsive action should affect based on the locations of the plurality of pathogen detectors that detect the presence of the pathogen; and performing or initiating the responsive action.

19. The method of claim 18, wherein the areas of the building that the responsive action should affect are determined based on locations of the building that the plurality of pathogen detectors monitor for the pathogen.

20. The method of claim 18, wherein the plurality of pathogen detectors are positioned at least one of:

proximate an entrance of the building;

in a high-traffic area of the building;

within a return air vent of the building;

in a room of the building; or in a sewage line of the building.

* * * * *